United States Patent [19]
Naybour et al.

[11] 3,870,848
[45] Mar. 11, 1975

[54] MAKING OF CONNECTIONS IN ELECTRICAL POWER DISTRIBUTION SYSTEMS

[75] Inventors: Robert Douglas Naybour, Mynydd Isa, Mold, North Wales; Trevor Farrell, Tarporley, England; William Elwyn Roberts, Llandudno, Wales

[73] Assignee: The Electricity Council, London, England

[22] Filed: Aug. 4, 1972

[21] Appl. No.: 277,951

[30] Foreign Application Priority Data
Aug. 5, 1971 Great Britain .................... 36910/71

[52] U.S. Cl. .............................................. 219/50
[51] Int. Cl. ............................................. H05b 1/00
[58] Field of Search ........ 307/100; 219/50, 119, 91; 339/114; 317/16, 40 A; 29/620, 584, 586; 324/52; 340/248 F, 248 W, 253 H, 253 W

[56] References Cited
UNITED STATES PATENTS

| | | | |
|---|---|---|---|
| 2,921,250 | 1/1960 | Swain | 317/40 A |
| 3,261,082 | 7/1966 | Maissel | 29/620 |
| 3,296,518 | 1/1967 | Stumpe | 317/40 A |
| 3,478,189 | 11/1969 | Estes | 219/119 |
| 3,555,357 | 1/1971 | Gregson | 317/16 |
| 3,646,305 | 2/1972 | Schmidtke et al. | 219/50 |
| 3,646,305 | 2/1972 | Schmidtke | 219/50 |
| 3,693,048 | 9/1972 | Doversberger | 317/40 A |

Primary Examiner—J. D. Miller
Assistant Examiner—Patrick R. Salce
Attorney, Agent, or Firm—Browne, Beveridge, DeGrandi & Kline

[57] ABSTRACT

An electrical connection in an alternating current mains power supply system is fritted by connecting a unit to the conductors on the side of the joint remote from the supply source, which unit contains a thyristor and a control circuit for connecting the thyristor across the supply to draw a current of at least 1000 amperes for half a cycle. The current is typically 2,000 amperes. Such a current will not affect the supply system, e.g. by causing protective circuit breakers to open, because of its very short duration but serves to frit a mechanical joint, making it a low impedance.

12 Claims, 2 Drawing Figures

PATENTED MAR 11 1975　　3,870,848

MAKING OF CONNECTIONS IN ELECTRICAL POWER DISTRIBUTION SYSTEMS

BACKGROUND OF THE INVENTION

1. Field of the Invention

This invention relates to the making of connections in joints in alternating current electrical power distribution systems and is concerned more particularly with the fritting of a joint, that is to say, the passing of a sufficient current through the interface of a mechanical connector to produce rapid heating and thereby reduce the contact resistance.

2. Prior Art

It is well known that the passage of a current through the interface of a mechanical connector increases the temperature of the conducting regions within the interface compared with the temperature of the bulk of the connector. The passage of this current can also result in changes in the nature of the interface.

The temperature, $T_i$, of the conducting regions in a contact is related to the voltage drop, $V$, across the contact, by the following equation.

$$T_i = (T_0^2 + V^2/4L)^{1/2} \qquad (1)$$

where $L$ is the Wiedemann-Franz-Lorenz number and $T_0$ is the bulk temperature. It is important to note that the rate of heating of the conducting regions is rapid; temperature rise times of the order of 10 microseconds are calculated, (Greenwood and williamson, Proc. Roy. Soc. A 246, 13 (1958).

When the voltage across a conducting metallic contact exceeds a certain characteristic value, $V_c$, a breakdown effect occurs which results in the contact becoming more conducting. This phenomenon is known as beta-fritting (Holm, Electric Contacts, 4th Edn. Springer Verlag, 1967). The temperature of the conducting regions within the interface is related to the contact voltage by equation (1), and thus there exists a characteristic temperature $T_c$ within those regions. If the current flowing through the contact is increased, so that $V_c$ and $T_c$ are exceeded, the contact resistance is reduced. Thus, in view of the rapid heating of the conducting regions, a large current pulse of short duration can reduce the contact resistance. In other words, a mechanical connector whose contact resistance is excessive, may be "repaired" merely by the passage of a large current pulse through it.

SUMMARY OF THE INVENTION

The present invention is concerned with an apparatus for and a method of fritting of joints in a power system making use of power from the system itself. Typically such a unit may be used for a low voltage power distribution system for example a 240 volt, 50 Hz or a 110 volt 60 Hz distribution system; in such a system there may be a large number of joints to be made as commonly the premises of each consumer are fed through a spur cable from a T-junction.

According to this invention, apparatus for fritting a joint in an alternating current power distribution system comprises a fritting unit having two terminals for connection to two conductors of the distribution system on the side of the joint remote from the power supply source, a triggerable discharge device connected across said terminals, means connected to said terminals for producing trigger pulses synchronised with the alternating supply fed to the terminals from said conductors and means operable to apply one of said trigger pulses to said discharge device to make it conductive for a short time period. The terminals of the device are connected to conductors between which a potential is maintained by the power supply source, e.g. a line and the neutral conductor. The discharge device is preferably a uni-directional discharge device, e.g. a thyristor, and the trigger pulse, when applied, is arranged to make the device conductive for substantially one-half cycle of the alternating supply. The discharge device, when triggered, puts a short circuit across the terminals so drawing a heavy short duration current through the joint. A current with a peak value of the order of 1,000 to 2,000 amps might be drawn for one half cycle; a small resistance may be provided to limit the current to the required maximum. Smaller currents will produce some fritting and, if necessary, repeated pulses of current may be used. The larger the current, the better the fritting but the current must not be so large that it affects the supply system, e.g. causes protective circuit breakers to open. Experiments show that currents of 1,000 to 2,000 amps peak value for one half cycle can readily be employed and it is preferred therefore to make the apparatus have an impedance such that the current drawn, when the apparatus is energized at the appropriate supply voltage, e.g. 240v 50Hz or 110v 60Hz, the current drawn is at least 1,000 amperes. It is found that, provided the duration is short, e.g. a half cycle, such a current will not affect the supply system.

The means for producing trigger pulses may comprise pulse shaping means connected across the terminals and operative on closing a switch to produce a single pulse of a predetermined duration. This pulse is applied to said discharge device. If this device is a thyristor, the trigger pulse duration is not critical provided it is timed to occur at or near the beginning of the half cycle so long as its duration is such that it does not extend into the next half cycle of the same polarity.

It is readily possible in typical electrical power supply distribution systems to draw a very heavy current for such a short time without any ill effects on the system and without rupturing any fuses. If the peak current through the discharge device is to be of the order of 1,000 to 2,000 amps, as a protection to the discharge device and also to the system, a fuse having a rating below the maximum prolonged current passable by the discharge device, for example a 60 amp. fuse, may be connected in series with the discharge device; such a fuse like the system, will pass a peak current much in excess of the rated capacity of the fuse provided the duration is sufficiently short.

The means for producing a single pulse conveniently comprises pulse shaping means producing a series of pulses synchronized with the cycles of the alternating supply mains, a resettable bi-stable device having two inputs and one output, means applying said series of pulses to one of said inputs, and a differentiating circuit connected to said output whereby, on application of a pulse to said one input, a single output pulse only is provided until the bistable device is reset by application of a single to the other output. Ganged switch means may be provided which are operative to complete a circuit for applying an output pulse from the bi-stable to the discharge device and simultaneously to complete a circuit from the pulse shaper to said one input of the bi-stable. Said switch means may include a change-over switch so that the pulses from the pulse shaper may be applied to either said one or said other input of the bi-stable whereby these pulses may be used for both setting and re-setting the bi-stable. The output from the bi-stable may be amplified by an amplifier and may be fed to the trigger electrode of the discharge device. e.g. through a fuse to the gate of a thyristor, the fuse providing protection for the electronic circuits should the thyristor become faulty. For further protection, a zener diode may be provided to limit the emitter to gate voltage on the thyristor.

The invention furthermore includes within its scope a method of fritting a joint in a 50 Hz or 60 Hz alternating current power distribution system comprising drawing a current of at least 1,000 amperes peak value for duration of one-half cycle of the supply through the joint.

DESCRIPTION OF THE PREFERRED EMBODIMENT

Figure 1:
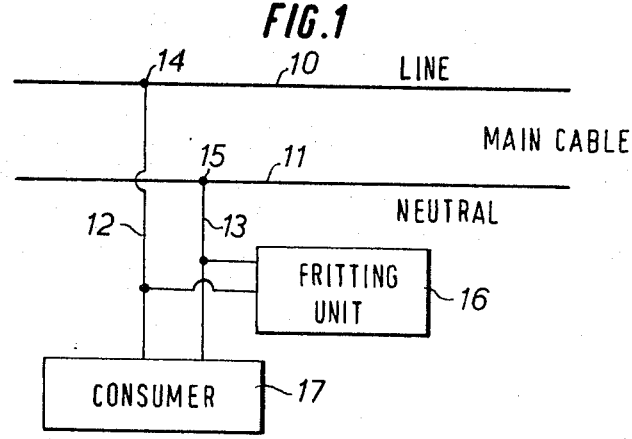
FIG. 1 illustrates diagrammatically how a fritting unit is connected to an alternating current supply system for fritting joints.

In FIG. 1 there is shown diagrammatically the line and neutral conductors 10 and 11 of an alternating current power supply distribution system. This might typically operate at 240 volts, 50 Hz or 110 volts 60 Hz. Spur conductors. 12, 13 are connected to these line and neutral conductors 10, 11 respectively by mechanically connected T-joints 14, 15 for feeding power supply to a consumer indicated by the block 16. After these T-junction connections have been made, a fritting unit indicated diagrammatically at 18 is connected across the conductors, 12 13 leading to the consumer in order to draw a large short duration current from the mains through the mechanical joints, thereby to frit the joints.

Figure 2:
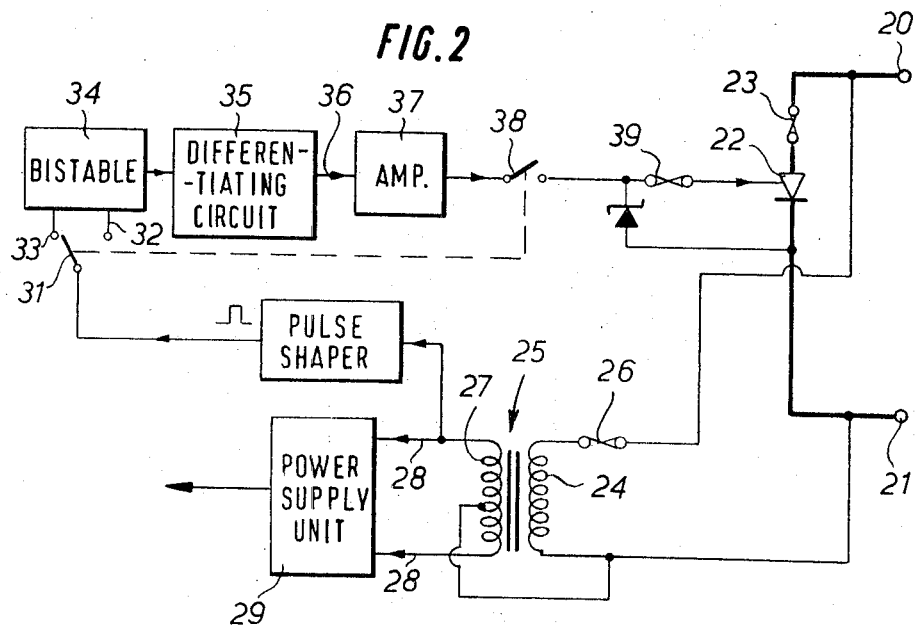
FIG. 2 is a block diagram illustrating the construction of the fritting unit.

FIG. 2 illustrates the construction of the fritting unit 18. It has terminals 20, 21, for connection respectively to the line and neutral conductors i.e., conductors 12 and 13 in FIG. 1. Connected across these terminals is a thyristor 22 in series with a fuse 23 to protect the thyristor. The fuse 23 has a rating dependent on the current rating of the thyristor and might typically be 60 amps. Also connected across the terminals 20, 21 is a primary winding 24 of a transformer 25, the primary winding having a series connected fuse 26 for protective purposes. The transformer has a secondary winding 27 with a centre tap connected to the neutral conductor 21 and providing output power on leads 28 for a DC power supply unit 29 providing DC power supplies for the electronic equipment to be described below. The secondary winding 27 of the transformer 25 also provides an alternating current signal to a pulse shaper 30, comprising a half-wave rectifier and squarer, which provides an output in a form of a continuous series of pulses synchronised with the cycles of the main supply and conveniently of one-half cycle duration, that is 10 m sec. for a 50 Hz supply system. These pulses each commence at or near the beginning of a half cycle of one polarity of the alternating supply and are applied to a mechanical change-over switch 31 enabling the pulse series to be applied either to a set input 32 or re-set input 33 of a bi-stable 34. The switch 31 may be manually operable. Application of any one pulse to an input of the bi-stable causes it to change its state and further pulses to that input then have no effect. However if the switch 31 is changed over, the pulses are then applied to the other input and the first pulse so applied is effective to switch the state of the bi-stable. The output from the bi-stable is fed to a differentiating circuit 35 so that, on switching from the reset to the set codition, the pulse only if it is of one polarity and thence it is fed via a single pole switch 38 ganged with the switch 31 through a fuse 39 to the gate of the aforementioned thyristor 22. Between the junction of the switch 31 and fuse 39 and the neutral line 11, there is connected a zener diode 40 to limit the voltate on the gate of the thyristor. The switch 38 is provided as a protection against spurious triggering.

Assuming that the switches are in a position shown in the drawing, a continuous stream of pulses is being fed from the pulse shaper to the re-set input 33 of the bi-stable 34 but these are not producing any output from the differentiating circuit 35 to the amplifier 37. When the switch is operated, the switch contact 38 is closed and the change-over switch contacts 31 causes a pulse to be applied to the set input 32 of the bi-stable 34. This changes over the state of the bistable 34 and so gives an output from the differentiating circuit 35 which is fed to the amplifier 37 and thus to the gate of the thyristor 22. The thyristor fires and, provided the input pulse is timed to occur at the beginning of a half cycle of the mains input voltage, a heavy current of one half cycle duration will be drawn through the thyristor 22 between the line and neutral conductors 10, 11. The bi-stable 34 will now be in the set condition and so the further pulses from the pulse shaper 30 will not fire the thyristor. The switches 31, 38 are ganged and, on putting the switch 31 back to its former state, the switch contact 38 is opened. The pulses are applied to the reset input 33 and will reset the bistable 34. The amplifier 37 however will reject the output pulse from the differentiating circuit 35 because this is of opposite polarity to an operating pulse. It will be seen therefore that the thyristor 22 fires only once for each switch operation. A single current pulse may often be sufficient. It has been found for example with an aluminium-/aluminium interface in a joint, that a satisfactory joint can be obtained, with the resistance reduced to the order of 84 $\mu$ ohms, using a peak current of 1,088 amperes. If the current drawn is small, a series of pulses will have to be used to obtain a satisfactory joint.

In the practical use of the device it is not possible to measure the impedance of each joint which is fritted: however, a current of the order of 2,000 amperes peak value can be used as it has been found that such a current can be drawn for a period of half a cycle without affecting the supply system; a current of this order will give a satisfactory low impedance joint using only a single pulse.

We claim:

1. Apparatus for fritting a joint in an alternating current power distribution system comprising a fritting unit having two terminals for connection to two conductors of the distribution system on the side of the joint remote from the power supply source, and including a triggerable discharge device connected across said terminals, a manually operable switch, pulse shaping means connected to said terminals for producing pulses synchronised with cycles of the alternating supply fed to said terminals from said conductors, and circuit means connected between the pulse shaping means and the triggerable discharge device and including said switch, which circuit means are operable on closure of said switch to apply to said discharge device one trigger pulse of predetermined duration derived from one of the pulses from the pulse shaping means to make the discharge device conductive for a short time period, said circuit means further including resettable inhibit means preventing application to said triggerable discharge device of further trigger pulses after said one trigger pulse.

2. Apparatus as claimed in claim 1 wherein the discharge device is a unidirectional discharge device.

3. Apparatus as claimed in claim 2 wherein said unidirectional discharge device is a thyristor.

4. Apparatus as claimed in claim 1 and having an impedance such ahat when an alternating voltage of 110 volts is applied to said terminals, a current of at least 1,000 amperes peak value can be drawn through the apparatus.

5. Apparatus as claimed in claim 1 wherein a fuse having a rating below the maximum prolonged current passable by the discharge device is connected in series with said discharge device.

6. Apparatus for fritting a joint in an alternating current power distribution system comprising a fritting unit having two terminals for connection to two conductors of the distribution system on the side of the joint remote from the power supply source, and including a triggerable discharge device connected across said terminals, pulse shaping means connected to said terminals producing a series of pulses synchronised with the cycles of the alternating supply fed to the terminals from said conductors, a resettable bistable device having two inputs and one output, means applying said series of pulses to one of said inputs, a differentiating circuit connected to said output, whereby, on application of a pulse to said one input, a single output pulse only is provided until the bistable device is reset by application of a signal to the other input and means operable to apply said single output pulse to said discharge device to make it conductive for a short time period.

7. Apparatus as claimed in claim 6 wherein ganged switch means are provided to complete a circuit for applying an output pulse from the bistable to the discharge device and simultaneously to complete a circuit from the pulse shaper to said one input of the bistable.

8. Apparatus as claimed in claim 7 wherein said switch means include a changeover switch so that the pulses from the pulse shaper may be applied to either said one or said other input of the bistable device whereby these pulses may be used for both setting and resetting the bistable.

9. Apparatus as claimed in claim 6 wherein an amplifier is provided arranged to amplify the output from the bistable and to feed it to a trigger electrode of the discharge device.

10. Apparatus as claimed in claim 9 wherein the discharge device is a thyristor and wherein a fuse is provided in the connection between the amplifier and the gate electrode of the thyristor.

11. Apparatus as claimed in claim 10 wherein a diode is connected in shunt between the emitter and the gate of the thyristor to limit the emitter to gate voltage on the thyristor.

12. A unit for fritting a joint in an alternating current power distribution system comprising two terminals for connection to two conductors of the distribution system on the side of the joint remote from the power supply source, a thyristor connected between said terminals with low impedance connection, said thyristor having a gate electrode, pulse shaping means connected to said terminals arranged for producing a series of pulses synchronised with the cycles of the alternating supply, a resettable bistable device having a set input, a reset input and one output, manually operable switch means connected between said pulse shaping means and said bistable device, which switch means include a changeover switch for applying pulses from said pulse shaping means alternatively to said set or to said reset input of said bistable device, a differentiating circuit connected to said output to provide a trigger pulse each time said bistable is switched to the set condition, and means connecting said differentiating circuit to said gate electrode so that the trigger pulse is applied to the thyristor, said differentiating circuit having a time constant such that the duration of the trigger pulse is less than one half cycle of the supply.

* * * * *